Jan. 25, 1955  L. J. SCHRADER  2,700,238
FISHING LINE FLOAT
Filed Feb. 16, 1954
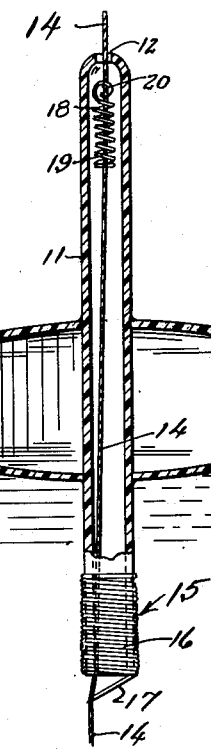
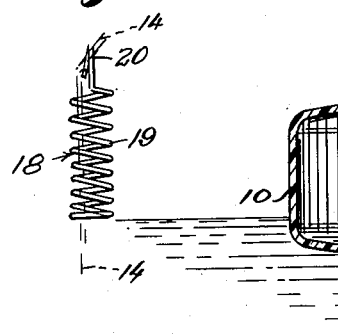
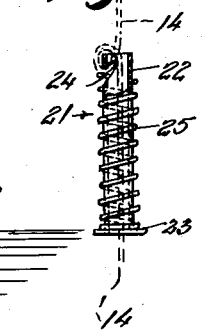
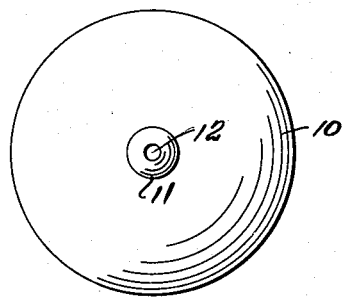
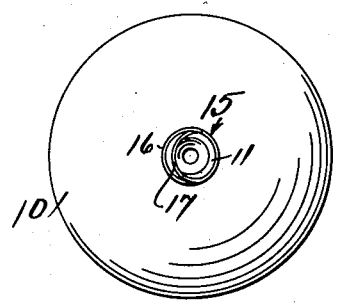
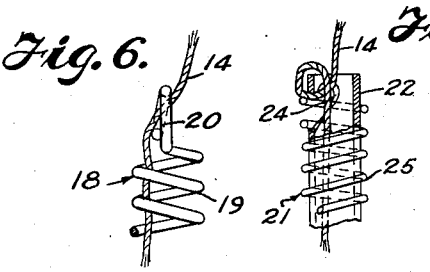
INVENTOR.
Louis J. Schrader
BY Victor J. Evans & Co.
ATTORNEYS

United States Patent Office 2,700,238
Patented Jan. 25, 1955

2,700,238

FISHING LINE FLOAT

Louis J. Schrader, Knox, Ind.

Application February 16, 1954, Serial No. 410,668

5 Claims. (Cl. 43—17)

This invention relates to fishing equipment, and more particularly to a fishing line float.

The object of the invention is to provide a fishing line float which will provide a visual indication for the fisherman, so that the fisherman can readily ascertain when a fish has struck the line or hook.

Another object of the invention is to provide a fishing line float that can be adjusted on the line and wherein there is provided a stationary float body and a movable slide indicator which is moved upon the striking of the fish on the line or hook, the present invention being constructed so that the fisherman can tell from the position of the indicator whether a fish has grabbed the line.

A further object of the invention is to provide a fishing line float which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a longitudinal sectional view taken through the float of the present invention.

Figure 1 is a top plan view of the float.

Figure 3 is a bottom plan view of the float.

Figure 4 is a detail elevational view of the slide indicator.

Figure 5 is a detail elevational view of a modified slide indicator, with parts broken away and in section.

Figure 6 is an enlarged fragmentary view illustrating the upper portion of the device of Figure 4; and Figure 7 is an enlarged fragmentary elevational view, with parts broken away and in section, showing the upper portion of the device of Figure 5.

Referring in detail to the drawings, the numeral 10 designates a hollow body member that can be made of any suitable transparent material or other buoyant material, and the body 10 acts as a float so that the device of the present invention will remain on top of the water 13, Figure 1. Extending through the float body 10 and secured thereto is a hollow transparent tube 11 which is provided with an aperture 12 in its upper end, and the lower end of the tube 11 is open. A fishing line 14 extends through the aperture 12 and also extends longitudinally through the tube 11.

Adjustably connected to the lower end of the tube 11 is a spring member 15 which includes a plurality of convolutions 16 that frictionally and slidably engage the exterior lower surface of the tube 11. The spring member 15 further includes a loop 17 which is arranged angularly with respect to the convolutions 16, and the loop 17 contacts a portion of the fishing line 14, which extends outwardly of the loop 17.

Movably mounted in the tube 11 is a slide indicator 18, Figure 4, and the slide indicator 18 may be made of a coil spring that has a bent or angularly arranged loop 20. The loop 20 engages a portion of the fishing line 14 so that as the line 14 moves, the slide indicator 18 will move therewith.

Thus, since the tube 11 and body 10 are transparent, the fisherman will be able to readily and visually observe the movement of the indicator 18 in the tube 11 so that the fisherman can readily see when a fish strikes the line 14. The slide indicator 18 may include a plurality of convolutions 19 through which extends the fishing line 14.

Referring to Figure 5 there is shown a modified slide indicator which is indicated generally by the numeral 21.

The indicator 21 is adapted to be used in place of the indicator 18, and the indicator 21 includes a sleeve 22 that is hollow and has its ends open, and an annular flange 23 is arranged on one end of the sleeve 22. A coil spring 25 is circumposed on the sleeve 22, and one end of the coil spring 25 abuts the flange 23. The sleeve 22 is provided with a notch 24 adjacent one end thereof, and a portion of the fishing line 14 is adapted to be arranged in engagement with the notch 24 and extends through the sleeve 22. Normally the spring 25 will expand beyond the notch 24 to retain the sleeve 22 and line 14 connected together so that movement of the line 14 will cause movement of the slide indicator 21.

From the foregoing it is apparent that there has been provided a fishing line float which will permit the fisherman to readily observe when a fish has struck the line. Normally the parts are in the position shown in Figure 1 and when a fish strikes the line, the line 14 will be pulled downwardly through the tube 11 and the slide indicator 18 will also be pulled downwardly since the loop 20 frictionally engages the line 14. Thus, when the slide 18 moves downwardly the fisherman will be able to see that a fish has struck the line. The body member 10 maintains the device on the top of the water 13. The spring member 15 frictionally engages the line 11 and can be slid up or down on the tube 11 so that different amounts of frictional resistance can be placed on the line 14 since the loop 17 contacts the line 14, and the line 14 contacts the lower portion of the tube 11. Instead of using the slide indicator 18, a slide indicator such as 21 can be used.

The body 10 is preferably made of a transparent plastic material. The fishing line 14 extends through the spring member 15 and is engaged by the loop 17 and the tube 11 always remains in a vertical position. The indicator 18 may be made of a rust proof spiral spring. The slide indicators are preferably painted with red fluorescent paint so that they can be seen when being used for night fishing.

To assemble the device, the fishing line 14 can be inserted through the aperture 12 and then threaded through the entire tube 11 and arranged in engagement with the slide indicator. Then, the line is adjusted for depth and made fast to the slide indicator. Next the slide indicator is pulled into the top of the tube 11, the line is slipped through the spring member 15 and threaded through and over the bent loop 17 and the spring member 15 is adjusted so that the line will not run freely. Then, the fishing line is drawn up so that the slide indicator 18 or 21 is at the top of the tube 11 and when the fish strikes, the slide indicator will move down independently of the float body 10. The sudden stopping of the slide indicator upon reaching of the bottom of the tube and abutting the loop 17 will cause the hook to become anchored in the mouth of the fish and when the fish starts to draw the bobber over the surface of the water, the fish will be caught.

It is to be understood that certain changes in design and details of construction can be resorted to without departing from the spirit of my invention or the scope of the appended claims.

I claim:

1. In a fishing line float, a body member providing a float, a hollow transparent tube extending through said body member and secured thereto, a fishing line extending through said tube, a spring member adjustably mounted on the lower end of said tube for engagement with the fishing line, and a slide indicator positioned in said tube and arranged in engagement with the line.

2. In a fishing line float, a hollow transparent body member providing a float, a transparent hollow tube extending through said body member and secured thereto, there being an aperture in the top of said tube, the lower end of said tube being open, a fishing line extending longitudinally through said tube, a spring member adjustably mounted on the lower end of said tube and including a plurality of convolutions surrounding said tube, said spring member including a loop arranged angularly with respect to said convolutions and coacting with the lower end of the tube to frictionally engage said fishing line, and a slide indicator positioned in said tube in engagement with said line.

3. The apparatus as described in claim 2, wherein said slide indicator includes a spring member including a loop contacting with said fishing line.

4. The apparatus as described in claim 2, wherein said slide indicator includes a sleeve having an annular flange on one end thereof and a notch adjacent the other end thereof for receiving said fishing line, and a coil spring circumposed on said sleeve and abutting said flange.

5. The apparatus as described in claim 2, wherein said slide indicator has luminous material on its outer surface.

References Cited in the file of this patent

UNITED STATES PATENTS

| | | |
|---|---|---|
| 2,208,240 | Arnesen et al. | July 16, 1940 |
| 2,275,076 | Haynes | Mar. 3, 1942 |
| 2,500,078 | Ingram | Mar. 7, 1950 |
| 2,587,190 | Merriweather | Feb. 26, 1952 |